July 2, 1957 — W. E. BURRELL — 2,797,770
FLANGE LUBRICATOR AND METERING VALVE THEREFOR
Filed Nov. 16, 1953 — 3 Sheets-Sheet 1
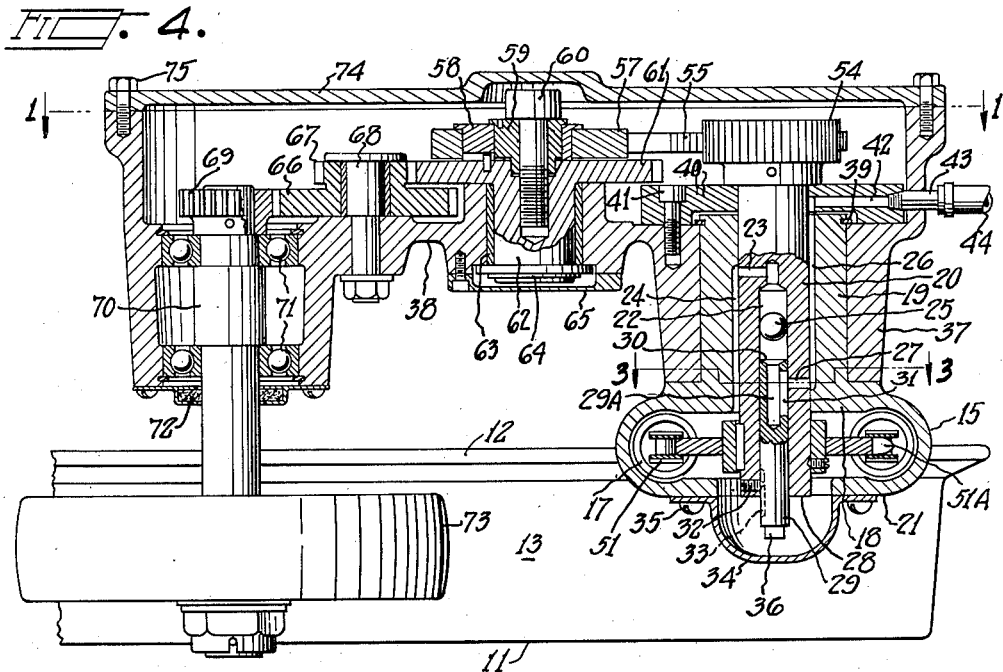
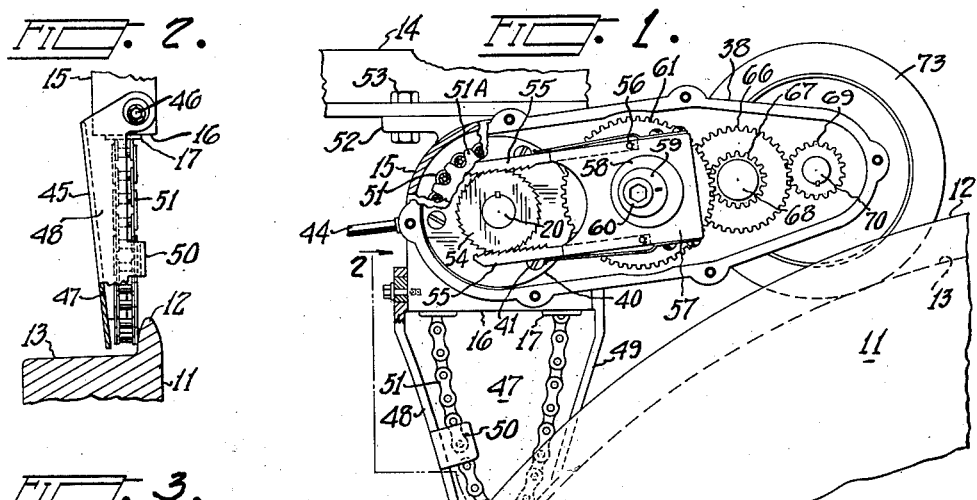
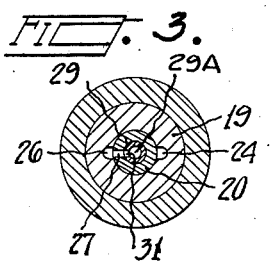
INVENTOR
WILLIAM E. BURRELL
ATTORNEY

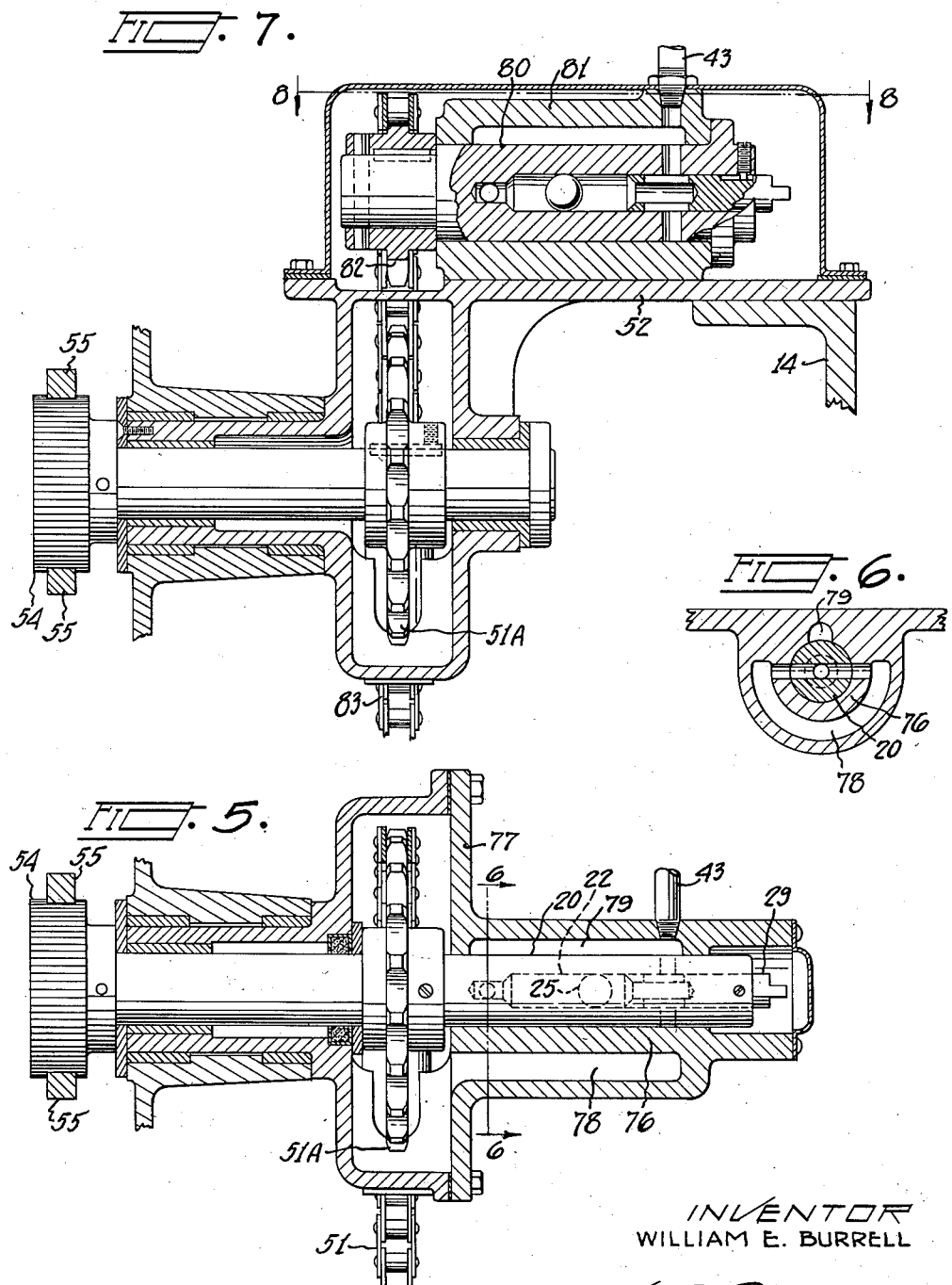

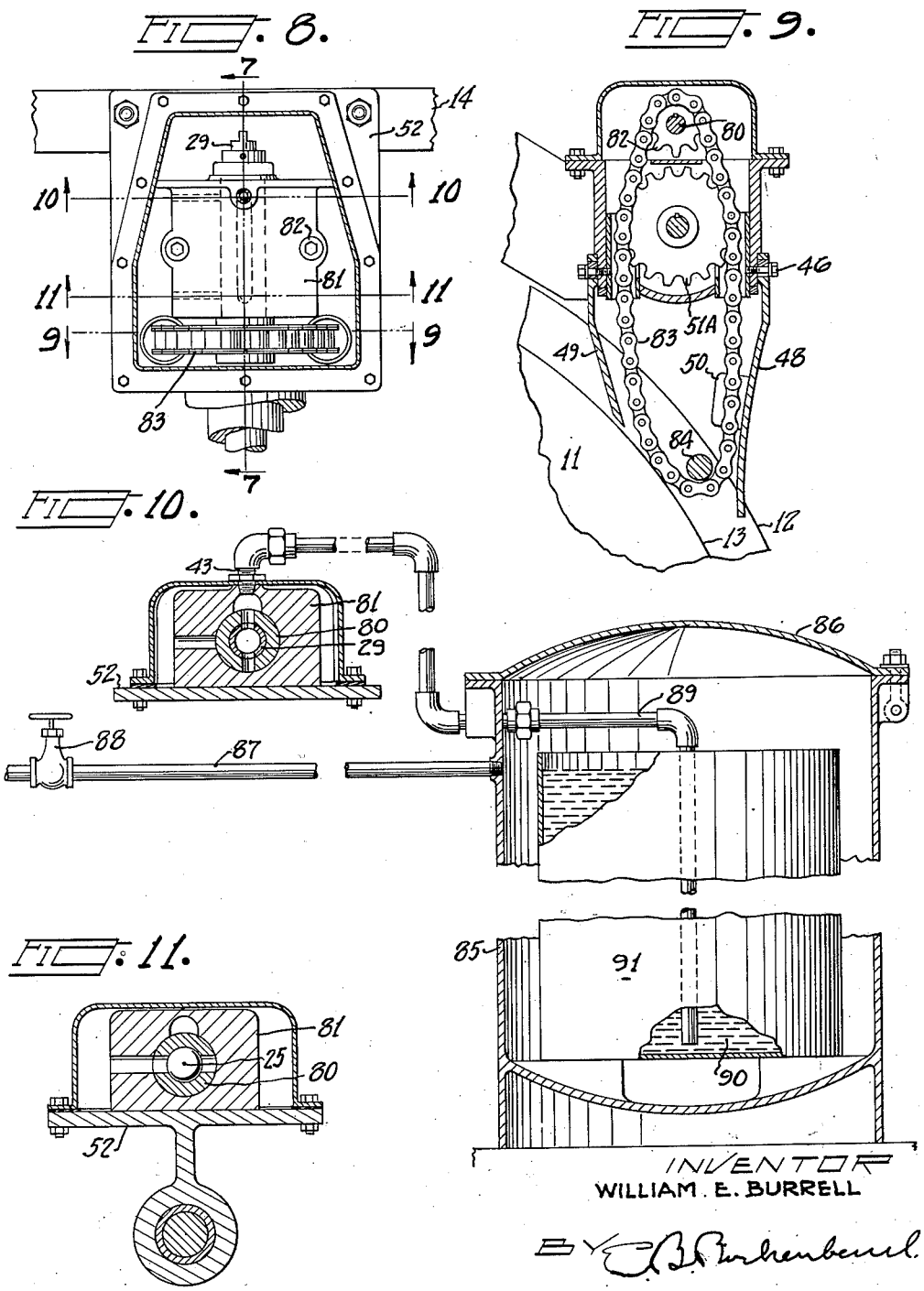

United States Patent Office 2,797,770
Patented July 2, 1957

2,797,770

FLANGE LUBRICATOR AND METERING VALVE THEREFOR

William E. Burrell, Portland, Oreg.

Application November 16, 1953, Serial No. 392,133

2 Claims. (Cl. 184—3)

This invention relates generally to vehicles operated on tracks and particularly to a flange lubricator and metering valve therefor.

Attention is drawn to my prior patents, No. 2,441,685, May 18, 1948, and No. 2,626,680, January 27, 1953, over which the device described herein is an improvement.

The main object of this invention is to provide a positive forced feed lubricator for locomotive wheel flanges and curves on tracks.

The second object is to simplify the construction and reduce cost of repairs as well as economize in space required for the installation thereof.

The third object is to economize in man hours for servicing the lubricator and increase the mileage before servicing is required by ten times the mileage obtainable from the type described in my former patents.

The fourth object is to reduce the amount of suspended weight and over-all clearance required so as to be able to place the lubricator in the most advantageous position for best performance.

The fifth object is to provide a common reservoir for lubricant to be supplied to a plurality of lubricators, thereby reducing spillage and insuring all of the lubricators receiving lubricant as long as any remains in the source of supply.

The sixth object is to so construct the lubricator in a manner to adapt it to the use of a remotely located cartridge of lubricant instead of requiring the use of wasteful and untidy pump or spoon now employed in filling a lubricant container made integral with the lubricator.

The seventh object is to utilize the available air pressure on the locomotive to deliver lubricant from the cartridge to the individual lubricators each adapted to meter the lubricant to its application chain.

I accomplish these and other objects in the manner set forth in the following specification as illustrated in the accompanying drawings, in which Fig. 1 is a rear elevation of the device with the cover plate removed and parts broken away in section, as viewed from line 1—1 in Fig. 4.

Fig. 2 is a fragmentary section taken along the line 2—2 in Fig. 1.

Fig. 3 is a section taken along the line 3—3 in Fig. 4.

Figure 4 is a plan view in partial section of a preferred form of the lubricator of this invention.

Fig. 5 is a vertical section through a modified form of metering shaft.

Fig. 6 is a section taken along the line 6—6 in Fig. 5.

Fig. 7 is a section showing the metering valve on a countershaft instead of on the axis of the drive shaft.

Fig. 8 is a section taken along the line 8—8 in Fig. 7.

Fig. 9 is a section taken along the line 9—9 in Fig. 8.

Fig. 10 is a section taken along the line 10—10 in Fig. 8, together with a section through the lubrication supply unit and connection to individual lubricator, and showing metering valve in position to take a charge from the supply unit.

Fig. 11 is a section taken along the line 11—11 in Fig. 8.

Like numbers of reference refer to the same or similar parts throughout the several views.

Referring first to Figs. 1 to 6, inclusive, which illustrate the preferred form of the device, there is shown a portion of a driving wheel 11 of a locomotive, of which wheel the flange 12 and rail-engaging face 13 are indicated. There is also indicated a portion of a locomotive frame 14 to which the units of the device are attached.

A chain housing 15 has a horizontal bottom 16 into which are inserted the chain guiding tubes 17. Projecting from the rear side 18 of the housing 15 is a hub 19 in which journals the metering shaft 20.

The shaft 20 extends from the outer side 21 of the housing 15 beyond the rearmost end of the hub 19. The shaft 20 has formed in its outer end a bore 22 whose outer end is connected by a hole 23 to the exterior of the shaft 20.

A grease-way 24 in the hub 19 extends from the hole 23 to the side 18, which allows grease to pass from the bore 22 into the chain housing 15.

A ball 25 is disposed in the bore 22 and is free to move along the bore 22 when pressure is applied to it. In the hub 19 is also formed a grease-way 26 which extends from the rear end of the hub 19 to a hole 27 in the shaft 20 between the hole 23 and the outer end 28 of the shaft 20.

In the end 28 of the bore 22 is inserted the plug 29, having a hole 29–A therein from its seated inner end 30 to approximately the middle of the length thereof. An elongated port 31 is formed in the plug 29 giving the plug 29 access to the hole 27 at various positions.

A setscrew 32 in the shaft 20 seats in a keyway 33 in the plug 29, making it possible to adjust its longitudinal position while maintaining its connection with the hole 27, thereby controlling the volume of free space within the bore 22.

On the outer side 21 of the chain housing 15 is secured a cap 34 by means of screws 35. A square end 36 is formed on the plug 29 to facilitate the adjustment thereof.

On the hub 19 journals the hub 37 of a swing arm 38. The arm 38 is held on the hub 19 by means of a snap-ring 39.

A circular cover plate 40, which is secured to the hub 37 by screws 41, is provided with a radial hole 42, which is joined by a nipple 43 to a flexible conduit 44 to which oil or grease is fed by pressure from a remote source of supply. The hole 42 communicates with the grease-way 26 through the outer face of the plate 40.

Depending from the chain housing 15 is a chain guard 45, which is free to swing on the pivot bolts 46.

The side 47, which is farthest from the rail 12, extends almost to the wheel face 13. The adjacent sides 48 and 49 are narrower and extend downwardly to the lower end of the side 47. A lip 50 is formed on the edge of the side 48 nearest the flange 12, its purpose being to prevent the chain 51 from swinging outwardly beyond the flange 12.

The housing 15 is provided with a plate 52, which is secured to the frame 14 by means of the bolts 53.

On the shaft 20, against the plate 40, is secured a ratchet wheel 54, the teeth of which are engaged by opposite pawls 55, each of which is hinged by means of a pin 56 to the plate 57 in which journals an outer eccentric 58, which is adjustably mounted on the inner eccentric 59, which is rotatable on the stud bolt 60, which is threaded into a gear 61 whose hub 62 journals in the bushing 63 in the arm 38. The hub 62 is held in place by a snapring 64. A cover plate 65 is placed over the end of the hub 62.

A combined gear and pinion 66 and 67 are mounted on the stud bolt 68, the latter meshing with the gear 61 and the former with the pinion 69 secured on the drive shaft 70 which journals in the anti-friction bearing 71 supported by the arm 38. With this construction it is seen that the throw or longitudinal movement of pawls 55 is governed by the eccentricity of the outer rim of eccentric 58 with respect to the axis of stud bolt 60 centered in hub 62 of gear 61 and the eccentricity of the outer rim of eccentric 58 is governed by the rotative position of eccentric 59 in eccentric 58. Thus the throw of pawls 55 is adjustable by loosening stud bolt 60 and relatively rotating eccentrics 58, 59, then tightening stud bolt 60 to hold eccentrics 58, 59 as desired. It is also seen that pawls 55 are each urged toward engagement with ratchet gear 54 by leaf springs (not numbered) secured to plate 57 by screws as shown. Pawls 55 are identical with identically formed teeth as shown so that as plate 57 moves toward gear 54 the upper pawl 55, see Figure 1, rotates gear 54 counterclockwise while the teeth of lower pawl 55 rides over the teeth of gear 54. In like manner when plate 57 moves to the right lower pawl 55 rotates gear 54 counterclockwise. Therefore as gear 61 rotates in either direction shaft 20 is rotated by ratchet wheel 50 intermittently in one direction at a frequency double the rotational speed of gear 61 and with an angular travel at each impulse governed by the eccentric adjustment of eccentrics 58, 59. An oil seal 72 is placed on the outer side of the bearings 71. On the shaft 70 is mounted a friction wheel 73 which supports the free end of the arm 38 upon the wheel surface 13.

A cover plate 74 is secured to the arm 38 by means of the screws 75 completely enclosing the gearing. The purpose of the gearing is to secure the great reduction required and at the same time provide the desired adjustment. Coupled with the adjustment for the metering device it can be seen that complete control is provided for the application of the lubricant.

Fig. 5 is a modified form of the mechanism shown in Fig. 4, except that it provides better outboard bearing. In this case the shaft 20 is elongated and its journal 76 is formed on the flange 77, which forms a cover plate for the chain housing while the ducts 78 and 79 are formed in the journal 76. This form of the device is also simpler and will better resist wear.

In the form of the device shown in Fig. 7, the metering unit is placed on top of the plate 52. In this case the shaft 80 journals in the block 81, which is secured to the plate 52. Here again the structure of the metering valve is the same as in the construction previously described, except that the shaft 80 has keyed thereon a sprocket pinion 82, around which the chain 83 passes while engaging the sprockets of the wheel 51–A. With this form of the device it is desirable to provide a stud 84, see Figure 9, in the side 47 of chain guard 45, see Figure 2, to prevent the chain from jumping the sprockets.

In Fig. 10 is shown the lubricant container 85, which is made to withstand the air pressure carried on locomotives. On the container 85 is a hinged cover 86. An air line 87, provided with a valve 88, opens into the container 85. For the lubricator of Figure 7, as shown in Figure 10, a discharge pipe 89 for lubricant 90 is connected to nipple 43 of the lubricator. For the lubricator of Figures 1 and 4, a flexible conduit 44 is connected to a reservoir outlet pipe such as pipe 89 in Figure 10. The lubricant is inserted in the container 85 in a cartridge or can 91.

The operation of the lubricator is as follows: Assuming that there is a supply of lubricant 90 in the container 85 and that air has been admitted by the valve 88, it follows from an inspection of Fig. 4 that lubricant 90 will be forced from the cartridge 91 through the pipe 89 and flexible conduit 44 and duct 42 to grease-way 26 which in this way is always kept filled with lubricant 90, under air pressure from line 87. Grease-way 24 is always open as shown in Figure 4 to the interior of chain housing 15. Holes 23 and 27 lead from the outer surface of shaft 20 to the bore 22 from opposite sides respectively. When the locomotive is in motion and shaft 20 is revolving, holes 23 and 27 cause the spaces on either side of ball 25 in bore 22 alternately to be placed in communication with grease-ways 24 and 26. When one of the spaces is in communication with grease-way 26 the other will be in communication with grease-way 24 and vice versa. Ball 25 acts as a piston in bore 22 and will always be moved away from the hole 23 or 27 which is open to the pressure grease-way 26. The space behind the moving ball will be filling with grease and conversely the grease in the space ahead of the moving ball will be discharging into grease-way 24. For each revolution of shaft 20 a definite volume of grease will be metered from grease-way 26 to grease-way 24 and on to chain 51 in chain housing 15.

With this device the quantity of lubricant delivered to the flanges is always directly proportional to the rim speed of the flange. Temperature and viscosity have no bearing on the rate of delivery. Also, all flanges will receive their proportionate share of lubricant. If any flange shows excessive wear, it can be given more lubricant by merely changing the setting of the metering shaft 20.

I claim:

1. Lubricating means for lubricating a locomotive wheel flange with a heavy viscous grease in quantitative response to the rotational speed of said wheel, said locomotive including a source of air under pressure and said lubricating means comprising: a source of said grease under pressure from said air; a rotary valve manifold body fixed to the frame of said locomotive; a rotary valve body journalled in said manifold body; transmission means interposed between said wheel and said rotary valve body to rotate said valve body in speed response to the speed of said wheel; a cylinder bore formed axially in said valve body; a free piston in said cylinder bore; an inlet manifold passageway formed in said manifold body; an outlet manifold passageway formed in said manifold body rotationally spaced from said inlet manifold passageway; inlet conduit means connecting said inlet manifold passageway with said source of grease under pressure; a grease applicator for applying said grease to said wheel; outlet conduit means connecting said outlet manifold passageway to said grease applicator; and a plurality of grease ports formed radially in said valve body to the bore thereof alternately to connect the opposite ends of said bore to said respective manifold passageways with one end of said bore always connected to a respective one of said manifold passageways when the other end of said bore is connected to the other respective one of said passageways.

2. The lubricating means of claim 1 in which said grease applicator includes a chain included in said transmission means.

References Cited in the file of this patent

UNITED STATES PATENTS

| 1,162,094 | Oden | Nov. 30, 1915 |
| 1,330,551 | Roth | Feb. 10, 1920 |
| 1,591,381 | Hatfield | July 6, 1926 |
| 1,770,389 | Bullock | July 15, 1930 |
| 1,805,609 | Wilson | May 19, 1931 |
| 2,254,274 | Doe | Sept. 2, 1941 |
| 2,406,239 | Moregenroth | Aug. 20, 1946 |
| 2,626,680 | Burrell | Jan. 27, 1953 |
| 2,704,137 | Stidd | Nov. 15, 1955 |

FOREIGN PATENTS

| 535,969 | Germany | Oct. 17, 1931 |
| 730,874 | Germany | Jan. 23, 1943 |
| 893,445 | France | Jan. 31, 1944 |